Figures 1, 2:
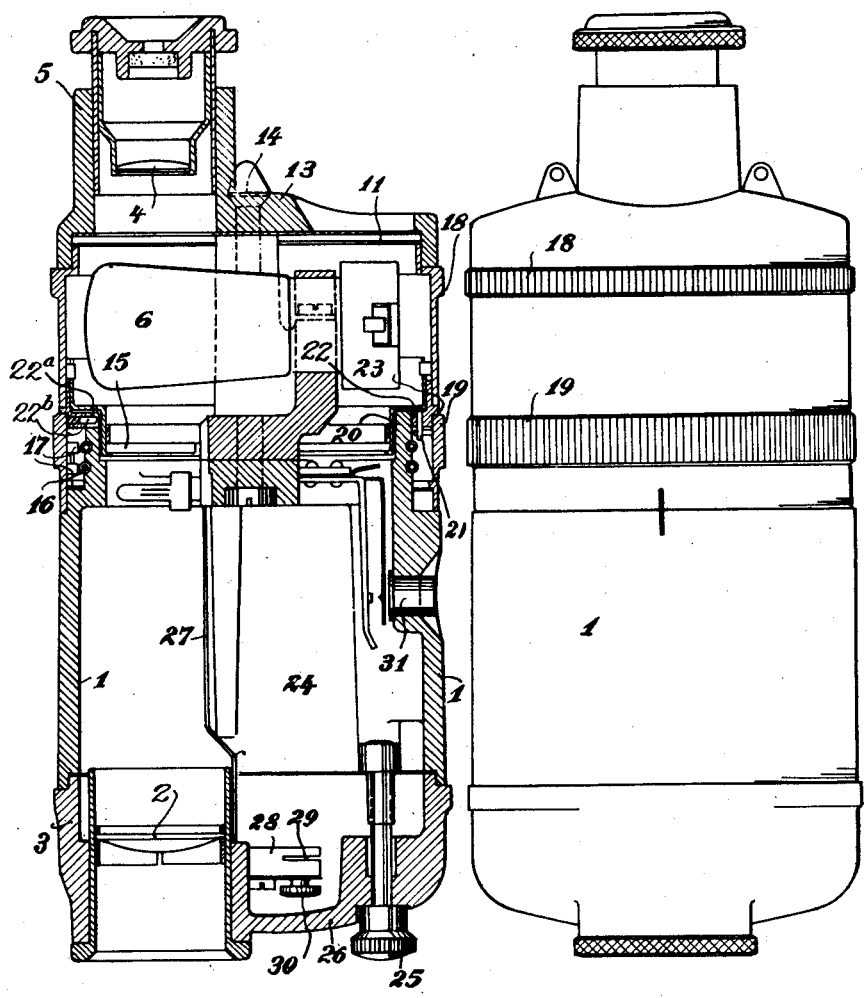

May 16, 1933. H. GRÜSS ET AL 1,908,977
OPTICAL PYROMETER WITH TWO FILAMENTS HEATED BY THE SAME SOURCE OF CURRENT
Filed Feb. 11, 1931 2 Sheets-Sheet 1

INVENTORS
HEINZ GRÜSS
HANS KLIMITZ
GUSTAV HAASE
RUDOLF SCHULTZE
HILDEGARD MIETHING
ATTORNEYS.

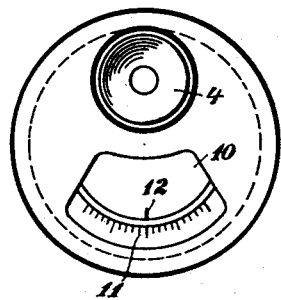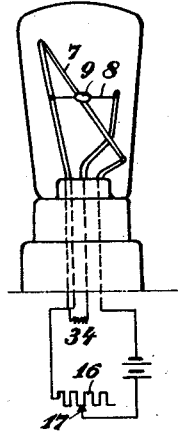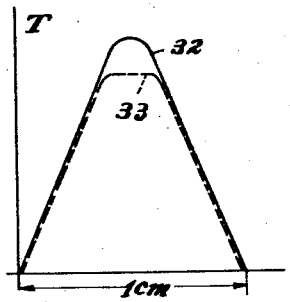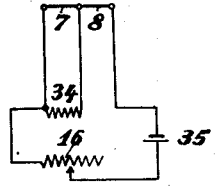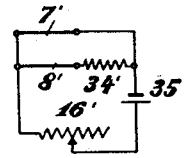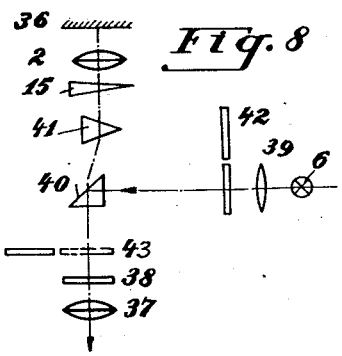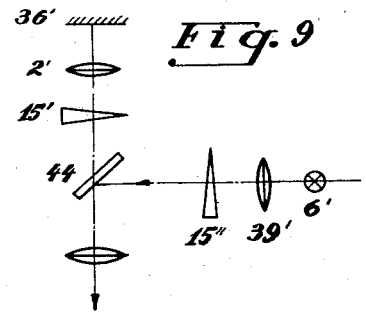

Patented May 16, 1933

1,908,977

UNITED STATES PATENT OFFICE

HEINZ GRÜSS, OF BERLIN-STAAKEN, HANS KLIMITZ AND GUSTAV HAASE, OF BERLIN-CHARLOTTENBURG, RUDOLF SCHULTZE, OF BERLIN-FRIEDENAU, AND HILDEGARD MIETHING, OF BERLIN-HERMSDORF, GERMANY, ASSIGNORS TO SIEMENS & HALSKE, AKTIENGESELLSCHAFT, OF SIEMENSSTADT NEAR BERLIN, GERMANY, A CORPORATION OF GERMANY

OPTICAL PYROMETER WITH TWO FILAMENTS HEATED BY THE SAME SOURCE OF CURRENT

Application filed February 11, 1931, Serial No. 514,936, and in Germany March 11, 1930.

The invention relates to optical pyrometers with two filaments heated by the same source of current.

In optical pyrometers the light given out by any hot body the temperature of which is to be determined is compared with a source of light whose temperature is known, generally an electrically heated filament. Since the temperature of an electrically heated filament depends upon the voltage of the source of current supply, these known devices give correct results only if the voltage of the source of current supply is kept permanently constant by special provisions because then only the temperature of the filament of the comparison source of light may be relied upon to have the prescribed known value.

To render superfluous this continuous control of the voltage which renders the handling of the pyrometer inconvenient, two filaments heated by the same source of current and of different current-temperature characteristics are according to the invention arranged in the same bulb, preferably closely together. Since these two filaments appear of equal brightness only if their radiation temperatures are equal, that is, the temperature at which a dark body has the same intensity as the filament, there is only a single supply voltage for the lamp at which the filaments have the same brightness. If thus prior to the temperature measurement the lamp voltage is so adjusted that both wires appear equally bright, it is in a simple manner made absolutely sure that the standard temperature upon which the calibration of the temperature scale was based actually prevails at the incandescent filaments.

It has already been proposed to employ in optical pyrometers two incandescent lamps connected in series and to vary the voltage until the two lamps appear equally bright. This arrangement has in comparison with the new device described herein the drawback that a special optical device is necessary to make a comparison between the brightnesses of the two lamps. This optical device consists in projecting the light of both incandescent lamps upon a transparent photometer screen and then, after the desired voltage or temperature has been adjusted by the aid of the spots of light produced upon the screen by the two lamps, removing one lamp with the screen out of the path of the beam of light of the other lamp, in order to carry out the temperature measurement in continuation thereof. This special arrangement of two separate incandescent lamps considerably enlarges the bulk of the optical pyrometer, renders its handling more difficult, reduces its sensitiveness, and has the further serious disadvantage that voltage fluctuations of the operating source of current cannot be supervised during the temperature measurements and thus lead to incorrect results.

The improved apparatus described herein has none of the above recited drawbacks. The two hot filaments preferably located crosswise in the same bulb, may be far more easily compared with each other, even while the temperature measurement is proceeding. The two filaments may be connected either in series or in parallel.

In the first case the fixed temperature is determined by the point of intersection of the current-temperature characteristics of the two filaments, while in the second case the voltage-temperature characteristics are decisive for the determination of the fixed temperature. For changing the characteristics of the two filaments, resistances independent of temperatures are preferably provided and, if desired, to make the heat discharge at the ends of the filaments of different values, one or both filaments are made of carbon, tantalum, rhenium, tungsten or a platinum alloy, preferably platinumrhodium.

Several embodiments of the invention are by way of example illustrated in the drawings affixed hereto and forming part of the specification. In the drawings Fig. 1 shows the improved pyrometer in elevation, Fig. 2 is a longitudinal section through the same, Fig. 3 is an end-elevation viewed from the ocular, Fig. 4 shows the preferred arrangement of the two incandescent filaments, as well as their wiring diagram, Fig. 5 is a graph for explaining Fig. 4,
Fig. 6 is the series connection diagram and
Fig. 7 the parallel connection diagram of the two filaments, Fig. 8 is a diagram of a modified arrangement of the optical parts of the pyrometer, and Fig. 9 illustrates another possibility of arranging these parts.

Referring to Figs. 1 to 4 of the drawings, it will be observed that all the constituent parts of the pyrometer are housed in a casing or box 1 constructed of a suitable material preferably by pressing, drawing or spinning. The objective 2 of the pyrometer is supported in the casing by means of a pressed guide member 3 and the ocular 4 by means of a similar guide member 5. Adjacent to the ocular, that is in the rear of the casing, is located the glass bulb 6 enclosing two crossed filaments 7 and 8, more clearly shown in Fig. 4. Preferably one filament 7 is constructed of strip material while the other filament 8 consists of a round wire provided with a broadened portion 9 at the crossing point of the two wires. The advantages of such a design of the two filaments will be more fully pointed out as the description proceeds. In proximity to the ocular the casing is provided with a kidney-shaped recess 10, Fig. 3, behind which a temperature scale 11 of a range of almost 360° is visible through a window. This scale 11 is circular in shape and a fixed mark 12 serves as pointer. The incandescent lamp 6 is easily accessible since the ocular 4 is mounted on a cover 13 which may be removed after loosening a screw 14.

In front of the glow lamp there is rotatably arranged a circular smoked wedge 15. At the side adjacent to the wedge 15 there is located a rheostat 16 on which slide two contacts 17. The adjustment of the wedge 15 and the scale 11 is accomplished by means of an adjusting ring 18 on the outside of the case 1 while a second, preferably broader ring 19 serves for adjusting the sliding contacts 17. The rheostat 16 on which slide the contacts 17, is connected in the circuit of the two glowing filaments, seen in particular Fig. 4. For limiting the adjusting range of the ring 19, a pin 20 is secured to the ring 19 and at the end of the adjustment range comes in contact with a stop 21. The stop 21 is provided upon a stationary intermediate ring 22 upon which the two adjustment rings 18 and 19, separated by a collar-like or annular projection 23 of the intermediate ring 22, are independently adjustable. The intermediate ring 22, as shown in Fig. 2, may be held against movement for instance by being provided upon its inner surface with a pin 22$^b$ which projects into a small recess or slot 22$^a$ formed in the casing 1 and extending in a direction parallel to the axis of the pyrometer.

In the compartment 24, provided in the front half of the casing 1 a storage battery is accommodated, which battery may be introduced into said compartment by first loosening the screw 25 and then removing the closing cap 26, which may be constructed of moulded material. Then the free ends of two angularly bent leaf springs 27 located above the compartment 24, one of which only is shown in Fig. 2 of the drawings, are bent upwards. The battery may now be slipped into the compartment 24, its two contact strips being turned outwards. Two contact members 28 mounted at right angles at the free ends of the leaf springs 27 have a slip 29 into which are inserted the contact strips of the battery. By adjusting a contact screw 30 the battery strips are firmly clamped in the slit 29 and thus a good contact is set up. The closing cap 26 is then replaced on the casing 1 and the screw 25 tightened. For connecting and disconnecting the battery a push-button 31 is provided on the case so as to be exteriorly accessible.

In the device described the employment of a strip-shaped glow filament 7, Figure 4, is particularly suitable because its broad side may conveniently be sighted. As second filament a shorter round wire 8 is preferably used and at the point of intersection with the strip 7 is preferably broadened by a suitable process of rolling. Such a design of the glow or incandescent filaments has been proved by many tests to be particularly efficient, as will be more fully explained with reference to the graph in Fig. 5 of the drawings. In this figure the curve 32 shows the course of the temperature in a piece of filament about half an inch length without broadening. As numerous tests with a filament including the broadened portion 9, Fig. 1, show, the curve 33 shown in broken lines in Fig. 5 is produced when such a filament is used. Its crest is flattened to a considerable extent. The temperature and thus also the brightness is consequently constant along a longer stretch of the filament whereby the comparison with the brightness of the other strip-shaped filament 7, Fig. 4, is greatly facilitated and a considerably greater accuracy of the adjustment of the standard temperature and the temperature to be measured is attained. Particularly favorable conditions in regard to the discharge of heat at the ends of the filaments are, furthermore, attained by using a comparatively short round wire and a longer strip filament. By means of the supporting wires to which the filaments are secured a cooling of the filaments of different degrees may be obtained, if desired. The broad side of the strip filament is preferably located transversely to the optical axis of the pyrometer. The two filaments and the adjusting resistances, if provided, should be so dimensioned, that the point of intersection of the current-temperature characteristic of the filaments is located in the temperature range of greatest adjusting accuracy, preferably between 1000 and 1300° C. In Fig. 4 such a rheostat is shown at 34.

It is advisable to choose the ratio of length to cross-section of the filament 8, Fig. 4, below 20,000:1. The ratio of length to cross-section of the strip filament 7 is preferably greater than that of the filament 8 which includes the broadened portion located at the point of intersection of the two filaments.

In Figs. 6 and 7 of the drawings different wiring arrangements are diagrammatically shown for the two filaments 7, 8. According to Fig. 6 the two filaments 7, 8 are connected in series to the battery 35. The rheostat common to both filaments is indicated at 16. For the filament 7 there is provided the additional adjusting resistance 34. According to Fig. 7 the two filaments marked 7' and 8' are connected in parallel to each other to the battery 35. The adjusting resistance 34' is in this example connected in series to the filament 8'. The rheostat common to both filaments 7' and 8' is marked 16'.

Fig. 8 illustrates diagrammatically the use of the pyrometer according to Figs. 1 to 4. The body whose temperature is to be determined is marked 36. The light given out by said body is collected by the objective lens 2 and passes through the smoked wedge 15 into the ocular consisting of a lens 37 and a color screen 38. The light given out by the glow lamp 6 is combined by means of a lens 39 and two prisms 40 and 41, with the light given out by the body 36 and is sent through the ocular 37, 38. The voltage of the filaments of the lamp is, in the manner described, so adjusted by means of the rheostat 16, 17, Fig. 4, that both filaments have the same brightness. By adjusting the smoked wedge 15 the intensity of the light given out by the body whose temperature is to be determined is weakened to such an extent that the filaments of the lamp 6 disappear in this light for the observer looking through the objective 37. Small voltage fluctuations during the measurement are at once observed and may be compensated by adjusting the rheostat 16.

The color screen 38 serves to make the measurement for a definite range of the spectrum. The smoked glass 42 is inserted into the path of the beam of light as required. If the temperature of the test body 36 is located above the fixed temperature the smoked glass 42 is outside the path of the beam in the position shown in full lines in Fig. 8. If, on the other hand, the temperature to be measured is located below that of the comparative source of light, the intensity of the light is weakened by inserting the smoked glass 42, into the path of the beam as indicated by broken lines in Fig. 8. The color screen 38 may, for instance, pass green or red light freely. Since when measuring the low temperatures the intensity of the long wave light preponderates in the spectrum, a filter 43 permeable for the red portion of the spectrum only is preferably simultaneously placed in front of the color filter 38. The smoked glass 42 and the filter 43 may be mechanically coupled in such a way that both are simultaneously placed into the path of the beam of light.

In the arrangement illustrated in Fig. 9 a semi-reflecting plate 44 is provided for combining the light given out by the hot body 36', which again passes through the objective 2' and the smoked glass 15', with the light given out by the incandescent or glow lamp 6' and passes through the lens 39'. Between the plate 44 and the lamp 6' to be compared there is, in this case, preferably inserted an additional smoked glass 15''. In this arrangement the standard or fixed temperature of the lamp may remain unchanged even if the temperature of the body to be examined is lower than that of the source of light to be compared. In this case the adjustment of the intensity of the comparative source of current to the intensity of the light given out by the body 36' to be examined is effected merely by displacing the smoked wedge of glass.

It will be understood that spun or otherwise machined metal and other materials may be employed for constructing the case or housing of the pyrometer instead of pressed or moulded materials.

We claim as our invention:

1. In an optical pyrometer with two filaments heated by the same source of current, filaments of different current-temperature characteristics crossing each other and located close together in the same bulb, and temperature independent resistances connected in the circuit of the two filaments for changing the current-temperature characteristic of the filaments.

2. In an optical pyrometer for measuring the temperature of an incandescent body by comparing the intensity of the rays emanating from the body with the intensity of the rays emanating from an electric incandescent filament held at a constant temperature, the combination of two incandescent filaments located in close proximity to each other in the same bulb, the current temperature-characteristics of said filaments intersecting each other, a source of electric current, circuit connections between the two incandescent filaments and said source of electric current adapted to bring said two filaments to incandescence, and means for adjusting the temperature of the two incandescent filaments to the intersection of their current temperature-characteristics.

3. In an optical pyrometer for measuring the temperature of an incandescent body by comparing the intensity of the rays emanating from the body with the intensity of the rays emanating from an electric incandescent filament held at a constant temperature, the combination of two incandescent filaments located in the same bulb and crossing each other in the line of vision of an observer, the current temperature-characteristics of said filaments intersecting each other, a source of electric current, circuit connections between the two incandescent filaments and said source of electric current to bring said two filaments to incandescence, and an adjusting rheostat located in said circuit connections for adjusting the temperature of the two incandescent filaments to the intersection of their current temperature-characteristics.

4. In an optical pyrometer for measuring the temperature of an incandescent body by comparing the intensity of the rays emanating from the body with the intensity of the rays emanating from an electric incandescent filament held at a constant temperature, the combination of an incandescent filament of carbon and a second incandescent filament of other material such, that the current temperature-characteristics of the carbon filament and the second filament intersect each other, means whereby said carbon filament and said second filament are mounted in the same bulb so as to cross each other in the line of vision of an observer, a source of electric current, circuit connections from said source of current whereby said carbon filament and second filament are brought to incandescence, and an adjusting rheostat located in said circuit connections for adjusting the temperature of both filaments to the intersection of their current temperature-characteristics.

5. An optical pyrometer as set forth in claim 4 in which the second incandescent filament is made of tungsten.

6. In an optical pyrometer for measuring the temperature of an incandescent body by comparing the intensity of the rays emanating from the body with the intensity of the rays emanating from an electric incandescent filament held at a constant temperature, the combination of a flat incandescent filament and a wire-like incandescent filament located in the same bulb and crossing each other with the plane of the flat filament extending transversely to the optical axis of the pyrometer and the current temperature-characteristics of said two filaments intersecting each other, electrical circuit connections between said filaments whereby the latter are brought to incandescence, and an adjusting rheostat located in said circuit connections for adjusting the temperature of both filaments to the intersection of their current temperature-characteristics.

7. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, means in said bulb for cooling the two filaments in a different degree, a source of electric current, circuit connections between the source of current and the two filaments adapted to bring the latter to incandescence, and a rheostat common to both filaments located in said circuit connections for adjusting the temperature of the two filaments to the intersection of their current temperature-characteristics.

8. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, wires for supporting said filaments in said bulb adapted respectively to develop a cooling effect of different degree upon said filaments, a source of electric current, circuit connections between said source of current and said filaments for bringing the latter to incandescence, and a rheostat common to both filaments located in said circuit connections for adjusting the temperature of the two filaments to the intersection of their current temperature-characteristics.

9. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, means for adjusting the temperature of the two filaments to the intersection of their current temperature-characteristics, and additional adjusting resistances of such dimensions that the point of intersection of the current temperature-characteristics of said filaments lies in a temperature range of from 1000 to 1300° C.

10. In an optical pyrometer for measuring the temperature of an incandescent body by comparing the intensity of the rays emanating from the body with the intensity of the rays emanatating from an electric incandescent filament held at a constant temperature, the combination of two incandescent filaments of different current temperature-characteristics which intersect each other, said filaments being located in the same bulb and crossing each other, an electric battery, an adjusting rheostat, circuit connections between the two filaments, the electric battery and the rheostat whereby said filaments are simultaneously brought to incandescence, and the temperature thereof is adjusted to the intersection of the current temperature-characteristics by means of said rheostat, a rotatable smoked glass wedge located between said incandescent body and said incandescent filaments, a casing containing said battery, the bulb containing the two filaments and the rheostat, and two independent adjusting rings mounted upon the exterior of said casing for respectively adjusting said rheostat and smoked glass wedge.

11. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, an electric battery, an adjusting rheostat, circuit connections between the two filaments, the electric battery and the rheostat whereby said filaments are simultaneously brought to incandescence, and the temperature thereof is adjusted to the intersection of the current temperature-characteristics by means of said rheostat, a rotatable smoked glass wedge located between said incandescent body and said incandescent filaments, a casing containing said battery, the bulb containing the two filaments and the rheostat, two independent adjusting rings mounted upon the exterior of said casing for respectively adjusting said rheostat and smoked glass wedge, and a stationary intermediate ring on said casing for guiding said adjusting rings.

12. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, an electric battery, an adjusting rheostat, circuit connections between the two filaments, the electric battery and the rheostat whereby said filaments are simultaneously brought to incandescence, and the temperature thereof is adjusted to the intersection of the current temperature-characteristics by means of said rheostat, a rotatable smoked glass wedge located between said incandescent body and said incandescent filaments, a casing containing said battery, the bulb containing the two filaments and the rheostat and being provided on its exterior surface with a recess, two independent adjusting rings mounted upon the exterior of said casing for respectively adjusting said rheostat and smoked glass wedge, a stationary independent ring located in said recess for guiding said adjusting rings, and a pin for fixing said intermediate ring in said recess.

13. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, an electric battery, an adjusting rheostat, circuit connections between the two filaments, the electric battery and the rheostat whereby said filaments are simultaneously brought to incandescence, and the temperature thereof is adjusted to the intersection of the current temperature-characteristics by means of said rheostat, a rotatable smoked glass wedge located between said incandescent body and said incandescent filaments, a casing containing said battery, the bulb containing the two filaments and the rheostat, two independent adjusting rings mounted upon the exterior of said casing for respectively adjusting said rheostat and smoked glass wedge, a stationary intermediate ring on said casing for guiding said adjusting rings, and an external annular projection on said intermediate ring for spacing the two adjusting rings apart.

14. In an optical pyrometer for measuring the temperature of an incandescent body by comparing the intensity of the rays emanating from the body with the intensity of the rays emanating from an electric incandescent filament held at a constant temperature, the combination of two incandescent filaments of different current temperature-characteristics which intersect each other, said filaments being located in the same bulb and crossing each other, a substantially cylindrical casing including an objective at its one end portion, an electric battery located in said casing adjacent to said objective, an adjusting rheostat in said casing, the latter containing also the bulb and its two filaments, circuit connections between the two filaments, the battery and the rheostat whereby said filaments are simultaneously brought to incandescence, and the temperature thereof is adjusted to the intersection of the current temperature-characteristics by means of said rheostat, a rotatable smoked glass wedge located between said incandescent body and said incandescent filaments, two independent adjusting rings mounted upon the exterior of said casing for respectively adjusting said rheostat and smoked glass wedge, and a push-button on said casing located in said circuit connections and exteriorly accessible for simultaneously switching said filaments into the battery circuit.

15. In an optical pyrometer for measuring the temperature of an incandescent body by comparing the intensity of the rays emanating from the body with the intensity of the rays emanating from an electric incandescent filament held at a constant temperature, the combination of an incandescent filament, a second wire-like filament flattened and broadened at an intermediate point, means for mounting said filaments in a common bulb so that said flattened portion of said second filament crosses the other filament in the line of vision of an observer, electric circuit connections for said filaments for bringing the same to incandescence, and means for adjusting the two incandescent filaments to the same temperature.

16. In an optical pyrometer for measuring the temperature of an incandescent body by comparing the intensity of the rays emanating from the body with the intensity of the rays emanating from an electric incandescent filament held at a constant temperature, the combination of a flat incandescent filament, a second wire-like filament flattened and broadened at an intermediate point, means for mounting said filaments in a common bulb so that said flattened portion of said wire-like filament crosses the flat filament in the line of vision of an observer, electric circuit connections for said filaments for bringing the same to incandescence, and means for adjusting the two incandescent filaments to the same temperature.

17. In an optical pyrometer for measuring the temperature of an incandescent body by comparing the intensity of the rays emanating from the body with the intensity of the rays emanating from an electric incandescent filament held at a constant temperature, the combination of a flat incandescent filament, a second wire-like filament flattened and broadened at an intermediate point, the ratio of length to cross-section of the flat filament being materially larger than the ratio of length to cross-section of the wire-like filament, means for mounting said filaments in a common bulb so that said flattened portion of said wire-like filament crosses the flat filament in the line of vision of an observer, electric circuit connections for said filaments for bringing the same to incandescence, and means for adjusting said filaments to the same temperature.

18. In an optical pyrometer for measuring the temperature of an incandescent body by comparing the intensity of the rays emanating from the body with the intensity of the rays emanating from an electric incandescent filament held at a constant temperature, the combination of an incandescent filament, a second wire-like filament flattened and broadened at an intermediate point, the current temperature-characteristics of said filaments intersecting each other, and the ratio of length to cross-section of the wire-like filament is less than 20,000 : 1, means for mounting said filaments in a common bulb so that said flattened portion of said wire-like filament crosses the other filament in the line of vision of an observer, electric circuit connections for said filaments for bringing the same to incandescence, and an adjusting rheostat in said circuit connections common to both filaments for adjusting the temperature of the two filaments to the intersection of their current temperature-characteristics.

19. In an optical pyrometer for measuring the temperature of an incandescent body by comparing the intensity of the rays emanating from the body with the intensity of the rays emanating from an electric incandescent filament held at a constant temperature, the combination of a flat incandescent filament, a second wire-like filament flattened and broadened at an intermediate point, the current temperature-characteristics of said filaments intersecting each other and the ratio of length to cross-section of the flat filament being materially larger than the ratio of length to cross-section of the wire-like filament, means for mounting said filaments in a common bulb so that the flattened portion of said wire-like filament crosses the flat filament in the line of vision of an observer, electric circuit connections for said filaments for bringing the same to incandescence, and an adjusting rheostat in said circuit connections common to both filaments for adjusting the temperature of the two filaments to the intersection of their current temperature-characteristics.

In testimony whereof we affix our signatures.

HEINZ GRÜSS.
HANS KLIMITZ.
GUSTAV HAASE.
RUDOLF SCHULTZE.
HILDEGARD MIETHING.